United States Patent [19]

Kobashi et al.

[11] 4,256,073

[45] Mar. 17, 1981

[54] METHOD OF CONTROLLING IGNITION TIMING OF AN INTERNAL COMBUSTION ENGINE

[75] Inventors: Mamoru Kobashi; Toshihisa Ogawa, both of Aichi, Japan

[73] Assignee: Toyota Jidosha Kogyo Kabushiki Kaisha, Toyota, Japan

[21] Appl. No.: 81,795

[22] Filed: Oct. 4, 1979

[30] Foreign Application Priority Data

Oct. 9, 1979 [JP] Japan ................................ 53/123572

[51] Int. Cl.³ .............................................. F02P 5/04
[52] U.S. Cl. ...................................... 123/422; 123/417
[58] Field of Search ........................ 123/117 R, 117 D

[56] References Cited

U.S. PATENT DOCUMENTS

| 4,018,197 | 4/1977 | Salway | 123/117 D |
|---|---|---|---|
| 4,068,631 | 1/1978 | Combard | 123/117 D |

Primary Examiner—Ronald B. Cox
Attorney, Agent, or Firm—Kenyon & Kenyon

[57] ABSTRACT

A spark-advance angle of an internal combustion engine is calculated based on at least one electrical signal which indicates an operating condition of the engine. The calculated spark-advance angle is compared with a lower limit of a required spark-advance angle, and then, if the calculated spark-advance angle is less than the lower limit, this calculated spark-advance angle is corrected so that it coincides with the lower limit.

6 Claims, 5 Drawing Figures

METHOD OF CONTROLLING IGNITION TIMING OF AN INTERNAL COMBUSTION ENGINE

BACKGROUND OF THE INVENTION

The present invention relates to a method of controlling ignition timing of an internal combustion engine by using an electronic ignition control system.

According to an ignition timing control method using an electronic ignition timing control apparatus, the operating condition of an internal combustion engine is detected by various sensors, and then, the optimum ignition timing is calculated based on detection signals from the various sensors by using a predetermined algorithm. In such method, the operating condition of an engine is generally detected by measuring the amount of air sucked into the engine and the rotational speed of the engine, or by measuring the vacuum level in an intake manifold of the engine and the rotational speed of the engine. Then, the ignition timing is controlled in such a manner that it is advanced, in other words, the spark-advance angle is controlled in such a manner that it is increased, when the rotational speed increases, and the ignition timing is controlled in such a manner that it is delayed, in other words, the spark-advance angle is controlled in such a manner that it is decreased, when the rotational speed decreases. Furthermore, the ignition timing is controlled in such a manner that it is delayed when the amount of air sucked into the engine increases or when the vacuum level decreases, and the ignition timing is controlled in such a manner that it is advanced when the amount of sucked air decreases or when the vacuum level increases.

However, when a conventional engine adopting the above-mentioned ignition timing control method is rapidly accelerated, since the amount of air sucked into the engine or the vacuum level in the intake manifold greatly increases or decreases, for a moment, the ignition timing is controlled in such a manner that it is excessively delayed. Particularly when the engine is rotating at a low speed, since the ignition timing changes greatly compared with the amount of change in the air sucked into the engine or in the vacuum level in the intake manifold of the engine, the above-mentioned tendency is extremely great. As a result, according to a conventional ignition timing control method, a quick increase of engine torque cannot be obtained during an accelerating operation. In other words, the accelerating characteristics are extremely poor in the conventional engine.

SUMMARY OF THE INVENTION

It is, therefore, an object of the present invention to provide an ignition timing control method whereby good accelerating characteristics can be obtained.

According to the present invention, the method of controlling ignition timing in an internal combustion engine comprises the steps of: generating at least one electrical signal which indicates an operating condition of the engine, calculating the spark-advance angle in the engine based on the generated electrical signal; determining a lower limit of a required spark-advance angle; comparing the value of the calculated spark-advance angle with the lower limit, and if the calculated spark-advance angle is less than the determined lower limit, correcting the calculated spark-advance angle so that it coincides with the lower limit; then, controlling the ignition timing of the ignition system of the engine in accordance with the calculated spark-advance angle.

The above and other related objects and features of the present invention will be apparent from the following description of the disclosure with reference to the accompanying drawings and also from the appended claims.

DETAILED DESCRIPTION OF THE INVENTION

Figure 1:
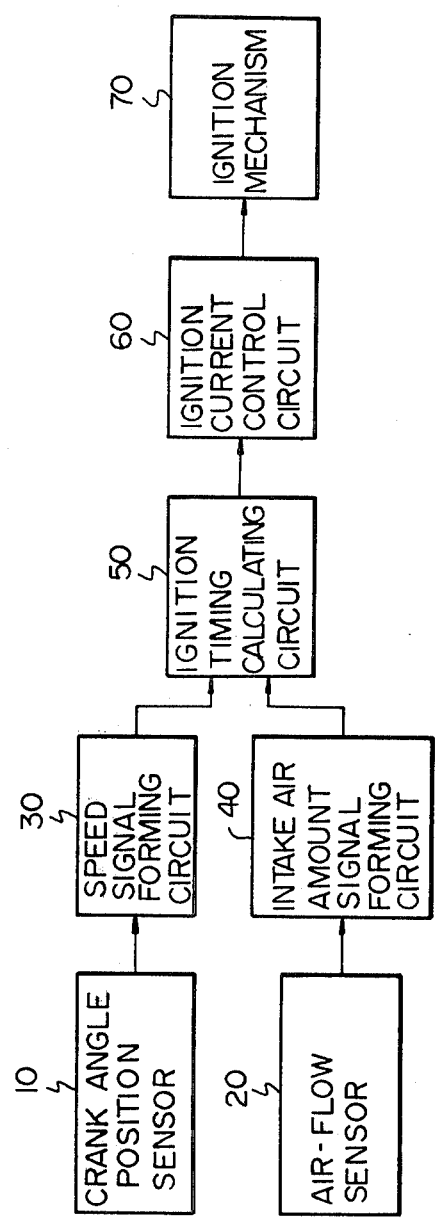
FIG. 1 is a schematic block diagram of an ignition control system in an embodiment according to the present invention.

Referring to FIG. 1, which is a schematic block diagram illustrating an ignition control system in an embodiment according to the present invention, reference numeral 10 indicates a crank angle position sensor fixed to an axle of a distributer of, for example, a four-cycle, six-cylinder type internal combustion engine. The sensor 10 generates a predetermined number of pulse signals, which have a pulse width corresponding to a predetermined crank angle, per one revolution of the axle of the distributer at every predetermined crank angle position. Furthermore, in FIG. 1, reference numeral 20 indicates a well-known air-flow sensor for generating an analog signal which indicates the amount of air sucked into the engine. The pulse signals fed from the crank angle position sensor 10 are applied to a speed signal forming circuit 30 for generating a digital signal which indicates the rotational speed Ne of the engine. The generated digital speed signal is applied to an ignition timing calculating circuit 50. The analog signal fed from the air-flow sensor 20 is amplified and converted into a digital signal at an intake air amount signal forming circuit 40, and then, applied to the ignition timing calculating circuit 50. In the ignition timing calculating circuit 50, an optimum ignition timing is calculated based on the applied digital signals. An ignition signal fed from the circuit 50 is applied to an ignition current control circuit 60 which controls ignition current transmitted into an ignition mechanism 70.

Figure 2:
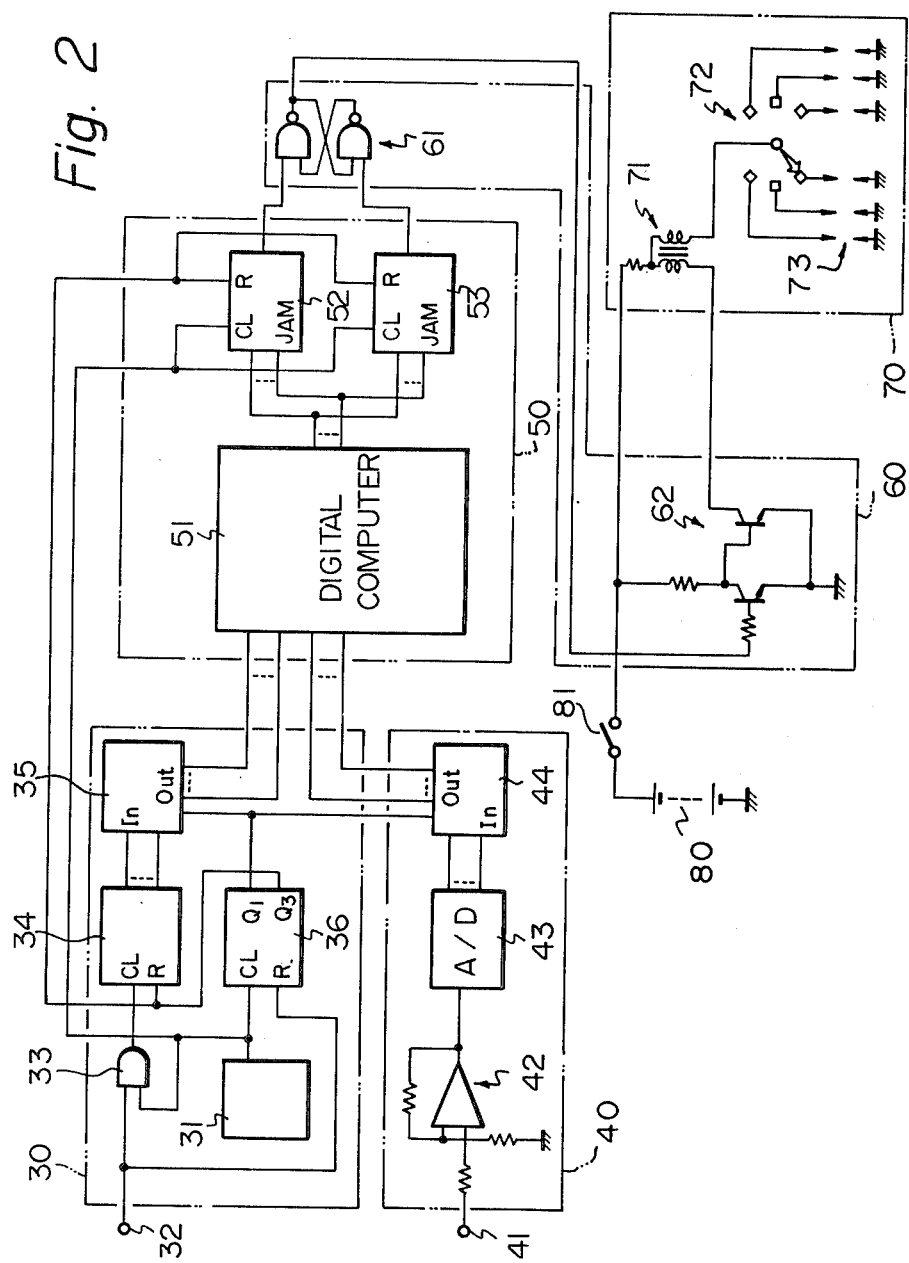
FIG. 2 is a detailed block diagram of a part of the ignition control system illustrated in FIG. 1.

FIG. 2 is a detailed block diagram illustrating a part of the ignition control system of FIG. 1. As illustrated in FIG. 2, the speed signal forming circuit 30 comprises: a clock signal generator 31; an AND gate 33, to which clock pulses fed from the generator 31 and pulse signals fed from the crank angle position sensor 10 via an input terminal 32 are applied; a binary counter 34 which counts the number of the clock pulses applied via the AND gate 33; a latch circuit 35 which momentarily stores outputs of the binary counter 34, and; a decade counter 36 for generating decade outputs which are used to control the reset timing of the counter 34 and the input operation of data applied to the latch circuit 35.

The binary counter 34 counts the number of clock pulses applied thereto while the pulse signal fed from the crank angle position sensor 10 is developed, in other words, while a crank shaft of the engine rotates the predetermined crank angle, and then, the latch circuit 35 stores the counted number of the counter 34 at every predetermined crank angle. As a result, a rotational speed signal of the engine is formed by this speed signal forming circuit 30.

The intake air amount signal forming circuit 40, for generating a digital signal which indicates the amount of air sucked into the engine, comprises: an amplifier 42 for amplifying the output analog signal fed from the air-flow sensor 20 via an input terminal 41; an analog-digital converter (A/D converter) 43 for converting the amplified analog signal to a digital signal, and; a latch circuit 44 for momentarily storing the converted digital signal at every predetermined crank angle.

The ignition timing calculating circuit 50 comprises: a digital computer 51 having a micro-processor and a read only memory (ROM) (not shown); a first presettable down-counter 52 for determining a time of stopping the current flowing to an ignition coil primary winding, that is, for determining ignition timing, and; a second presettable down-counter 53 for determining a time of initiating the current flowing to the ignition coil primary winding. The digital computer 51 calculates an optimum spark-advance angle based on the rotational speed signal and the intake air amount signal which are fed from the above-mentioned forming circuits 30 and 40, by using an algorithm described hereinafter; then, calculates a first time period required by the crank shaft for rotating from the predetermined crank angle position to a position of the obtained optimum spark-advance angle, and; thereafter, feeds the down-counter 52 a digital signal having a value of the calculated first time period divided by a period of the clock pulses applied to the down-counter 52. Furthermore, the digital computer 51 calculates a time of initiating the current flowing to the ignition coil primary winding by using well-known method; then, calculates an second time period between the time of initiating the current flowing and the time corresponding to the predetermined crank angle position; and thereafter, feeds the down-counter 53 with a digital signal having a value of the calculated second time period divided by a period of the clock pulses applied to the down-counter 53.

The ignition current control circuit 60 comprises: a flip-flop 61 which is set and reset by outputs fed from the first and second down-counter 52 and 53, respectively, and; a driving circuit 62 for on-off controlling current which is fed from a battery 80 via an ignition switch 81 to a primary winding of an ignition coil 71 in the ignition mechanism 70, in accordance with an output from the flip-flop 61.

The ignition mechanism 70 is composed of a well-known mechanism which includes the aforementioned ignition coil 71, a distributer 72 and spark plugs 73.

The calculation of the spark-advance angle by the digital computer 51 will now be described.

Figure 3:
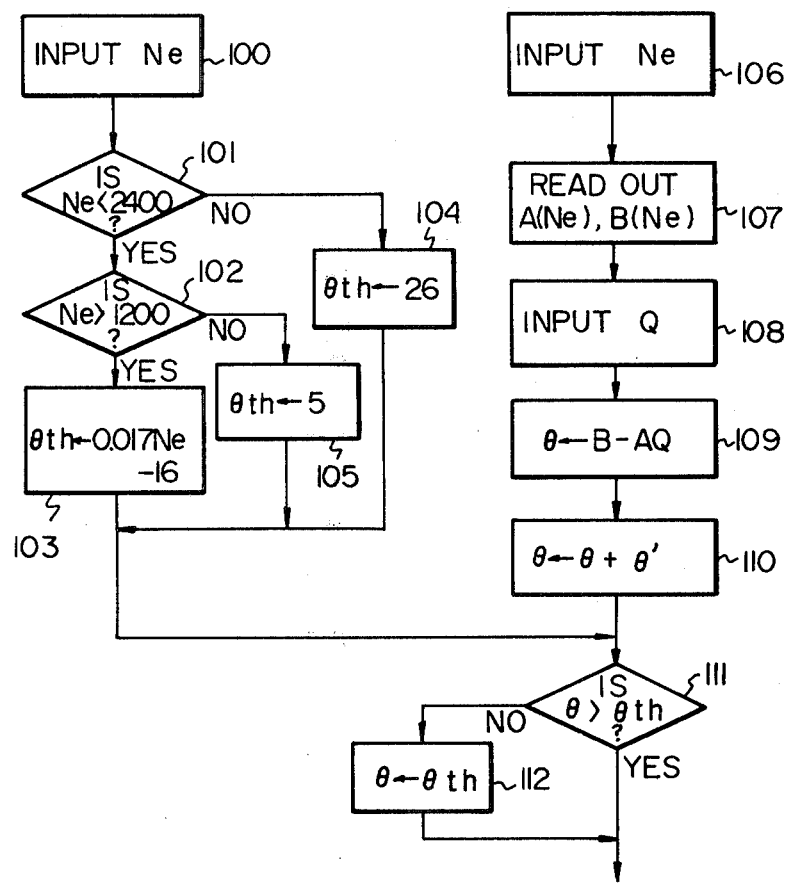
FIG. 3 is a flow chart illustrating the operation of a digital computer in the ignition control system.

FIG. 3 is a flow chart of a program for calculating an optimum spark-advance angle, which program is preliminarily stored in the ROM in the digital computer 51. As shown in FIG. 3, at a point 100 in the program, the speed signal which indicates the rotational speed Ne (rpm) of the engine is input from the forming circuit 30. Then, at points 101 and 102, whether the rotational speed Ne is smaller than 2,400 rpm and whether and rotational speed Ne is larger than 1,200 rpm are judged, respectively. If the rotational speed Ne is 1,200 rpm<-Ne<2,400 rpm, the program proceeds to a point 103. If the rotational speed Ne is Ne≧2,400 rpm, lower limit $\theta$th of a spark-advance angle $\theta$ is determined as $\theta$th=26° at a point 104. If the rotational speed Ne is Ne≦1,200 rpm, a lower limit $\theta$th of a spark-advance angle is determined as $\theta$th=5° at a point 105.

At the point 103, a lower limit $\theta$th is calculated based on the rotational speed Ne by using a following equation.

$$\theta\text{th} = 0.017\,Ne - 16$$

Figure 4:
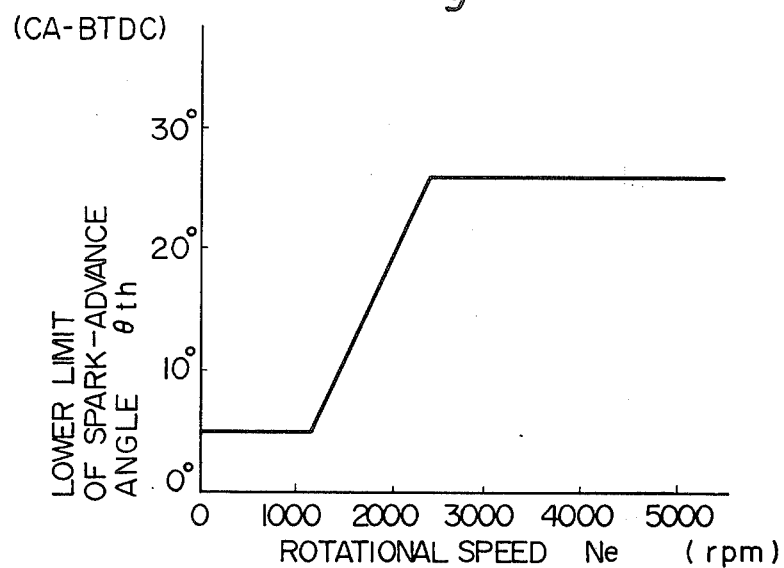
FIG. 4 is a graph of a lower limit of a spark-advance angle versus rotational speed of the engine.

According to the above-mentioned procedures of the program from the points 100 to 105, the lower limit $\theta$th of a spark-advance angle as a function of the rotational speed Ne, as indicated in FIG. 4, is obtained.

On the other hand, the digital computer 51 calculates a spark-advance angle in accordance with a following procudure when the interruption occurs at every predetermined crank angle position or at every predetermined timing.

Figure 5:
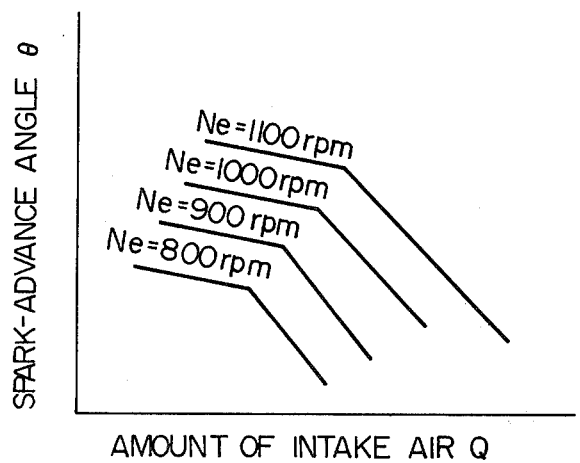
FIG. 5 is a graph of a spark-advance angle versus rotational speed of the engine and amount of air sucked into the engine.

At a point 106, the computer 51 inputs the speed signal indicating the rotational speed Ne, and then, at a point 107, reads out factors A(Ne) and B(Ne) from the ROM, as a function of the rotational speed Ne. In the ROM, these factors A(Ne) and B(Ne), which respectively indicate an inclination and an intercept of an algebraic equation expressing the relationship between the amount Q of intake air and a spark-advance angle $\theta$, are stored as a function of the rotational speed Ne of the engine. In this embodiment, since the relationship between the amount Q of intake air and a spark-advance angle $\theta$ is represented by a linear equation, only two factors for every rotational speed are required. However, when the calculation of the spark-advance angle is performed in accordance with the relationship represented by two linear equations as shown in FIG. 5, it is necessary to store at least five factors for every rotational speed in the ROM.

At a point 108, a signal which indicates the amount Q of air sucked into the engine is input from the forming circuit 40. Then, at a point 109, calculation of a spark-advanced angle is carried out by using the equation $\theta = B - AQ$. Thereafter, at a point 110, the calculated spark-advance angle $\theta$ is corrected in accordance with the amount of exhaust gas recirculated into the engine, the atmospheric pressure around the engine, or other various operating conditions and surrounding conditions of the engine, by using the equation $\theta = \theta + \theta'$, and then, the program proceeds to a point 111.

At the step 111, the lower limit $\theta$th of a spark-advance angle, which is determined at the above-mentioned step 103, 104, or 105, is compared with the spark-advance angle $\theta$ obtained by the step 110. If the spark-advance angle $\theta$ is larger than the lower limit $\theta$th, this spark-advance angle $\theta$ is output as an optimum spark-advance angle. In the case where the spark-advance angle $\theta$ is not larger than the lower limit $\theta$th, the program proceeds to a step 112, and then, the calculated spark-advance angle is made equal to the lower limit $\theta$th.

Therefore, according to the present invention, since the obtained spark-advance angle $\theta$ is always controlled in such a manner that it is equal to or above a lower limit $\theta$th shown in FIG. 4, excessive delay of the ignition timing is prevented with certainty. As a result, a quick increase of engine torque can be obtained when the engine is rapidly accelerated. In other words, according to the present invention, good acceleration characteristics of the engine can be obtained.

As many widely different embodiments of the present invention may be made without departing from the spirit and scope of the present invention, it should be understood that the present invention is not limited to the specific embodiments described in this specification, except as defined in the appended claims.

What is claimed is:

1. A method of controlling ignition timing of an internal combustion engine, having an ignition system, comprising the steps of:

generating at least one electrical signal being indicative of an operating condition of said engine;

calculating the spark-advance angle in said engine based on said generated electrical signal;

determining a lower limit of a required spark-advance angle;

comparing the value of said calculated spark-advance angle with said lower limit, and it said calculated spark-advance angle is less than said lower limit, correcting said calculated spark-advance angle so that it coincides with said lower limit, and; then, controlling the ignition timing of said ignition system in accordance with said calculated spark-advance angle.

2. A method of controlling ignition timing as claimed in claim 1, wherein said step of determining the lower limit of the required spark-advance angle includes a step of determining the lower limit of the required spark-advance angle based on said generated electrical signal.

3. A method of controlling ignition timing as claimed in claim 2, wherein said generated electrical signal used for determining the lower limit of a required spark-advance angle is composed of an electrical signal indicative of the rotational speed of said engine.

4. A method of controlling ignition timing as claimed in claim 2 or 3, wherein said engine has a digital computer, and said step of determining the lower limit of the required spark-advance angle includes a step of calculating the lower limit of the required spark-advance angle by said digital computer programmed to calculate said lower limit from at least one specific algebraic function.

5. A method of controlling ignition timing as claimed in claim 1, 2 or 3, wherein said step of generating at least one electrical signal includes a step of generating an electrical signal which indicates the rotational speed of said engine and an electrical signal which indicates the amount of air sucked into said engine.

6. A method of controlling ignition timing as claimed in claim 1, 2 or 3, wherein said engine has a digital computer and said step of calculating the spark-advance angle in said engine includes a step of calculating the spark-advance angle by said digital computer programmed to calculate said angle from at least one specific algebraic function.

* * * * *

UNITED STATES PATENT AND TRADEMARK OFFICE
CERTIFICATE OF CORRECTION

PATENT NO. : 4,256,073
DATED : March 17, 1981
INVENTOR(S) : Mamoru Kobashi and Toshihisa Ogawa It is certified that error appears in the above—identified patent and that said Letters Patent is hereby corrected as shown below:

Col. 3, line 39, change "an" to --a--.

Col. 4, line 19, change "procudure" to --procedure--.

Col. 4, line 43, change "advanced" to --advance--.

Col. 5, line 20, change "it" to --if--.

Signed and Sealed this

Sixteenth Day of June 1981

[SEAL]

Attest:

RENE D. TEGTMEYER

Attesting Officer  Acting Commissioner of Patents and Trademarks

UNITED STATES PATENT AND TRADEMARK OFFICE
CERTIFICATE OF CORRECTION

PATENT NO. : 4,256,073
DATED : March 17, 1981
INVENTOR(S) : Mamoru Kobashi and Toshihisa Ogawa It is certified that error appears in the above—identified patent and that said Letters Patent is hereby corrected as shown below:

In Paragraph [30], please correct the filing date of the Japanese Application from October 9, 1979 to --October 9, 1978--

Signed and Sealed this

Twenty-first Day of July 1981

[SEAL]

Attest:

GERALD J. MOSSINGHOFF

Attesting Officer

Commissioner of Patents and Trademarks